United States Patent
Payot et al.

(10) Patent No.: US 8,481,645 B2
(45) Date of Patent: Jul. 9, 2013

(54) STABILIZER POLYMER AND COATING COMPOSITIONS THEREOF

(75) Inventors: Nicolas Payot, Tournus (FR); Georges Sion, Mancey (FR); Benoit Prouvost, L'Abergement de Cuisery (FR); Paul Stenson, Gattikon (CH)

(73) Assignee: Valspar Sourcing, Inc., Minneapolis, MN (US)

( * ) Notice: Subject to any disclaimer, the term of this patent is extended or adjusted under 35 U.S.C. 154(b) by 769 days.

(21) Appl. No.: 12/594,019

(22) PCT Filed: Mar. 31, 2008

(86) PCT No.: PCT/US2008/058899
§ 371 (c)(1),
(2), (4) Date: Sep. 30, 2009

(87) PCT Pub. No.: WO2008/121959
PCT Pub. Date: Oct. 9, 2008

(65) Prior Publication Data
US 2010/0056726 A1      Mar. 4, 2010

Related U.S. Application Data

(60) Provisional application No. 60/909,621, filed on Apr. 2, 2007.

(51) Int. Cl.
*B32B 27/06*     (2006.01)
*B32B 27/36*     (2006.01)
*C09D 167/07*    (2006.01)

(52) U.S. Cl.
USPC ............. 525/165; 525/55; 525/63; 525/166; 525/167.5; 525/239; 525/418; 427/385.5

(58) Field of Classification Search
USPC ........... 427/385.5; 525/7, 7.4, 63, 165, 167.5, 525/176, 221, 222, 239, 55, 166, 168, 169; 523/407, 408, 410, 412, 409, 411, 413, 423; 524/504

See application file for complete search history.

(56) References Cited

U.S. PATENT DOCUMENTS

| | | | |
|---|---|---|---|
| 3,700,624 A * | 10/1972 | Adachi et al. | 524/141 |
| 4,104,217 A | 8/1978 | Leistner et al. | |
| 4,584,241 A | 4/1986 | Choi et al. | |
| 5,514,433 A | 5/1996 | Cole | |
| 6,787,188 B1 | 9/2004 | Metcalfe | |
| 6,916,874 B2 | 7/2005 | Mazza et al. | |
| 6,924,328 B2 | 8/2005 | Legleiter et al. | |
| 6,994,888 B2 | 2/2006 | Metcalfe | |
| 2003/0064185 A1 | 4/2003 | Mazza | |
| 2003/0134976 A1 | 7/2003 | Metcalfe | |
| 2006/0202161 A1 | 9/2006 | Share et al. | |
| 2007/0036903 A1 | 2/2007 | Mayr et al. | 427/402 |
| 2007/0054140 A1 | 3/2007 | Mayr et al. | 428/480 |

FOREIGN PATENT DOCUMENTS

| WO | WO03022945 A1 | 3/2003 |
| WO | WO-2005080517 A1 * | 9/2005 |
| WO | WO-2007/021780 A2 | 2/2007 |

OTHER PUBLICATIONS

International Search Report and Written Opinion for PCT/US2008/058899 dated Jul. 11, 2008 (8 pages).
European Search Report dated Aug. 24, 2012 from European Patent Application No. 08744777.7.

* cited by examiner

*Primary Examiner* — Irina S Zemel
*Assistant Examiner* — Jeffrey Lenihan
(74) *Attorney, Agent, or Firm* — Brian R. Morrison; Westman, Champlin & Kelly, P.A.

(57) ABSTRACT

A stabilizer polymer and coating compositions containing the stabilizer polymer are provided. The stabilizer polymer preferably includes a polyester backbone and a plurality of carbon-carbon double bonds. A coating composition is provided that preferably includes the stabilizer polymer, an acrylic component, and a thermoplastic dispersion. In a preferred embodiment, the acrylic component is included in the stabilizer polymer.

20 Claims, No Drawings

STABILIZER POLYMER AND COATING COMPOSITIONS THEREOF

CROSS REFERENCE TO RELATED APPLICATION

This application is the National Stage filing under 35 U.S.C. 371 of International Application No. PCT/US2008/058899 filed on Mar. 31, 2008, which claims the benefit of U.S. Application No. 60/909,621 filed on Apr. 2, 2007 both of which are incorporated herein by reference in their entirety.

TECHNICAL FIELD

This invention relates to coating compositions and processes for making coating compositions. More specifically, this invention relates to coating compositions that include a thermoplastic material.

BACKGROUND

Conventional container coatings may be derived from a thermally curable formulation that includes particles of a thermoplastic material (typically vinyl chloride polymers such as, for example, polyvinylchloride ("PVC")), in an organic solvent. When these coatings are applied to a substrate and cured, the thermoplastic material can degrade and discolor. Degradation products such as, for example, hydrochloric acid ("HCl") can attack the substrate. To stabilize the thermoplastic material and reduce degradation, epoxy resins may be added to the coating formulation that typically include polyglycidyl ethers of aromatic polyols such as bisphenol A (often referred to as "BADGE"). Epoxy novolacs and epoxidized linseed oil have also been used as a stabilizer for thermoplastic coating formulations.

Conventional epoxy-containing thermoplastic coating formulations may include small amounts of (1) unreacted bisphenol A ("BPA") or BADGE and (2) low-molecular-weight components containing BPA or BADGE which, in the food packaging industry, can potentially migrate into packaged foodstuffs over time. Although the balance of scientific evidence available to date does not indicate clearly that traces of these compounds that might be released from existing coatings pose health risks to humans, these compounds are perceived by some people as being potentially harmful to human health. Consequently, there is a desire to reduce or eliminate these compounds from food-contact coatings. However, it has been problematic to formulate thermoplastic coating formulations that exhibit very low or non-detectable levels of mobile forms of these compounds while still retaining the required coating characteristics (e.g., flexibility, adhesion, corrosion resistance, stability, etc.).

Conventional thermoplastic formulations may also include certain tin-containing compounds (e.g., such as tin mercaptans or tin carboxylates) that are also perceived by some people as being undesirable for use in food-contact coatings. Similar to BPA and BADGE, there is also a desire to reduce or eliminate these compounds from food-contact coatings.

Thus, there is a continuing need for improved stabilizer polymers for use in producing coating compositions that include thermoplastic materials such as PVC.

SUMMARY

In one embodiment, the present invention provides a coating composition that includes a resin system and a thermoplastic dispersion. The resin system preferably includes (i) a stabilizer polymer that includes a polyester backbone and a plurality of carbon-carbon double bonds and (ii) an acrylic component. In some embodiments, the acrylic component is included in the stabilizer polymer.

In another embodiment, the present invention provides a coating composition that includes a resin system, polyvinyl chloride particles, and a liquid carrier. The resin system includes a stabilizer polymer that preferably has a polyester backbone and a pendant group that contains at least one carbon-carbon double bond. The pendant group is preferably a reaction product of an unsaturated fatty acid. In some embodiments, the pendant group is a reaction product of an unsaturated fatty acid and a hydroxyl group of a structural unit of the polyester backbone.

In yet another embodiment, the present invention provides an article containing the coating composition described herein adhered to at least one surface of the article.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the description below. Other features, objects, and advantages of the invention will be apparent from the description and the claims.

DEFINITIONS

The term "substantially free" of a particular mobile compound means that the compositions of the present invention contain less than 100 parts per million (ppm) of the recited mobile compound.

The term "essentially free" of a particular mobile compound means that the compositions of the present invention contain less than 10 parts per million (ppm) of the recited mobile compound.

The term "essentially completely free" of a particular mobile compound means that the compositions of the present invention contains less than 1 part per million (ppm) of the recited mobile compound.

The term "completely free" of a particular mobile compound means that the compositions of the present invention contain less than 20 parts per billion (ppb) of the recited mobile compound.

If the aforementioned phrases are used without the term "mobile" (e.g., "substantially free of BPA compound") then the compositions of the present invention contain less than the aforementioned amount of the compound whether the compound is mobile in the coating or bound to a constituent of the coating.

The term "mobile" means that the compound can be extracted from the cured coating when a coating (typically ~1 mg/cm$^2$ (6.5 mg/in$^2$) thick) is exposed to a 10 weight percent ethanol solution for two hours at 121° C. followed by exposure for 10 days in the solution at 49° C.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds (e.g., such as a vinyl group). The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups.

A group that may be the same or different is referred to as being "independently" something. Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The term "food-contact surface" refers to a surface of an article (e.g., a food or beverage container) that is in contact with, or suitable for contact with, a food or beverage product.

The term "stabilizer polymer" refers to the polymer of the present invention. This term is used for purposes of convenience and is not intended to be limiting. Unless indicated otherwise, the term does not require that the polymer must be suitable in any particular embodiment for stabilizing another material.

Unless otherwise indicated, a reference to a "(meth)acrylate" compound (where "meth" is bracketed) is meant to include both acrylate and methacrylate compounds.

The term "polycarboxylic acid" includes both polycarboxylic acids and esters or anhydrides thereof.

The term "organosol" refers to a dispersion of thermoplastic particles in a liquid carrier that includes an organic solvent or a combination of an organic solvent and a plasticizer.

The term "plastisol" refers to a dispersion of thermoplastic particles in a plasticizer.

The term "easy open end" refers to a can end (typically an end of a food or beverage container) that includes (i) a frangible opening portion (which for some beverage can ends functions as a drinking spout) and (ii) a riveted portion for attaching a pull tab thereto for purposes of opening the frangible opening portion to access the product housed within a can or container.

The term "acrylic component" includes any compound, polymer, or organic group that includes (meth)acrylate monomers, oligomers, and/or polymerizable polymers.

The term "crosslinker" refers to a molecule capable of forming a covalent linkage between polymers or between two different regions of the same polymer.

The term "polymer" includes both homopolymers and copolymers (i.e., polymers of two or more different monomers).

The terms "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" amine can be interpreted to mean that the coating composition includes "one or more" amines.

Also herein, the recitations of numerical ranges by endpoints include all numbers subsumed within that range (e.g., 1 to 5 includes 1, 1.5, 2, 2.75, 3, 3.80, 4, 5, etc.).

DETAILED DESCRIPTION

The present invention provides a stabilizer polymer, as well as coating compositions containing the stabilizer polymer. In a preferred embodiment, the coating composition of the present invention is an organosol coating composition, which contains the stabilizer polymer and is suitable for contacting food or beverage products.

The invention further provides packaging articles such as, for example, food and beverage containers, wherein at least a portion of a substrate (typically a metal substrate or a primed metal substrate) is coated with a coating composition that preferably includes (i) a resin system containing the stabilizer polymer, (ii) a thermoplastic material, (iii) a carrier, and (iv) an optional crosslinker. In such coating compositions, the stabilizer polymer of the present invention is preferably capable of stabilizing the thermoplastic material (e.g., PVC) to prevent or decrease degradation of the thermoplastic material or a cured coating resulting therefrom.

The invention further provides a method of coating a packaging article. The method includes forming a coating composition described herein and applying the composition to a substrate prior to, or after, forming the substrate into a packaging article or a portion thereof.

In one presently preferred embodiment, the resin system of the present invention (and preferably the stabilizer polymer of the resin system) includes one or more (and preferably a combination) of the following: saturated or unsaturated fatty acid groups, carbon-carbon double bonds (preferably at least some of which are incorporated via an unsaturated fatty acid), oxirane groups, hydroxyl groups, and an acrylic component. The presence (or absence) of these components/groups, as well as their amount, can vary depending upon a variety of factors including, for example, whether it is desired that the stabilizer polymer be free of BPA and aromatic glycidyl ether compounds.

In some embodiments, the resin system (and preferably the stabilizer polymer) includes oxirane groups, fatty acid groups, carbon-carbon double bonds (preferably at least some of which are incorporated via one or more unsaturated fatty acids), and an optional acrylic component. In one such embodiment, the stabilizer polymer is a reaction product of components that include a BADGE component.

However, as discussed above, due to the perceptions some people hold with regards to BPA and BADGE, there is presently a desire by some people to reduce or eliminate these compounds from food-contact coatings. Thus, in some embodiments, the stabilizer polymer (and preferably the resin system) of the present invention is formed using components that do not contain BPA, bisphenol F (BPF) or aromatic glycidyl ether compounds (e.g., BADGE or diglycidyl ethers of BPF (BFDGE)). In one such embodiment, the stabilizer polymer includes fatty acid groups (preferably one or more unsaturated fatty acid groups), carbon-carbon double bonds (preferably at least some of which are incorporated via one or more unsaturated fatty acids), hydroxyl groups, and an optional acrylic component.

In particularly preferred embodiments, the stabilizer polymer is an acrylated, fatty-acid-modified polyester that includes a plurality of carbon-carbon double bonds.

The stabilizer polymer of the present invention is preferably the reaction product of a composition that includes a component having one or more carbon-carbon double bonds. Preferably, at least some of the carbon-carbon double bonds are present on the resulting stabilizer polymer. While not intending to be bound by theory, the carbon-carbon double bonds are thought to fulfill a variety of functions including one or both of (a) stabilizing thermoplastic materials (e.g., such as PVC) and coating compositions containing the thermoplastic materials through scavenging of degradation products (e.g., HCl) and (b) providing reaction sites for attaching one or more optional acrylic components to the stabilizer polymer.

The number of carbon-carbon double bonds present on the stabilizer polymer can be any suitable number to produce the desired result. In preferred embodiments, the stabilizer polymer includes at least about 0.05, more preferably at least about 0.08, and even more preferably at least about 0.1 moles of carbon-carbon double bonds per 100 grams (g) of dry resin.

The carbon-carbon double bonds can be present at any suitable location of the stabilizer polymer. For example, carbon-carbon double bonds can be located on a backbone of the polymer, on it pendant group of the polymer, or a combination of both. In a presently preferred embodiment, at least some of the carbon-carbon double bonds are present in one or more pendant groups that include an unsaturated fatty acid.

In particularly preferred embodiments, some or substantially all of the carbon-carbon double bonds on the stabilizer polymer are provided through incorporation of one or more unsaturated fatty acids. The one or more unsaturated fatty acid groups can be present in a backbone of the stabilizer polymer (e.g., through use of a fatty acid dimer), a pendant group of the stabilizer polymer, or a combination of both. While any suitable compound may be used to incorporate some or all of the carbon-carbon double bonds into the stabilizer polymer of the present invention, unsaturated fatty acids are presently preferred due to a variety of factors, including, for example, availability and cost.

The stabilizer polymer of the present invention can include any suitable type of backbone. The backbone can have different configurations depending upon, for example, the types of components used to form the backbone and the desired use for the stabilizer polymer. In some embodiments, the backbone may include one or more condensation linkages such as, for example, amide, ester, epoxide, urea, or urethane linkages, or a combination thereof. In some embodiments, the backbone may include one or more addition linkages or a combination of addition and condensation linkages.

In preferred embodiments, the backbone includes one or more ester linkages and is preferably a polyester backbone. While not intending to be bound by theory, a polyester backbone is thought to enhance compatibility of the stabilizer polymer with thermoplastic materials such as PVC. The polyester backbone is preferably the reaction product of components that include (i) a polyol containing at least two hydroxyl groups and (ii) a polycarboxylic acid containing at least two carboxyl groups (which can be an anhydride or ester). In general, suitable polyesters may include polymer linkages, side chains, and end groups not related to simple polyol and polycarboxylic acid components. In some embodiments, alkyd compounds may be useful for forming the polyester backbone or other portions of the stabilizer polymer.

Examples of suitable polycarboxylic acids include aliphatic, cycloaliphatic, or aromatic acids such as aconitic, adipic, azelaic, beta-acryloxypropionic, camphoric, citraconic, cyclohexane dicarboxylic (e.g., 1,2-, 1,3-, or 1,4-cyclohexanedicarboxylic acid), dimethyl propionic, endomethylenetetrahydrophthalic, fumaric, glutaric, methylene glutaric, glutaconic, hexahydrophthalic, isophthalic, itaconic, maleic, 2-methyl maleic, malonic, mesaconic, muconic, naphthalic, phthalic, pyrometillitic, sebacic, suberic, succinic, terephthalic acids, tetrahydrophthalic acid, trimellitic, tricarballylic, tricarboxyethylene, saturated or unsaturated dimer fatty acids, and anhydrides, derivatives, and mixtures thereof.

Polycarboxylic acids can be included at any suitable level to achieve the desired result. In preferred embodiments, the stabilizer polymer includes at least about 30, more preferably at least about 40, and even more preferably at least about 50 weight percent ("wt-%") of one or more polycarboxylic acids, based on the total weight of non-volatile components used to form the stabilizer polymer and not including the weight of any components used to form optional acrylic component(s) (if present). Preferably, the stabilizer polymer comprises less than about 70, preferably less than about 65, and even more preferably less than about 60 wt-% of one or more polycarboxylic acids, based on the total weight of non-volatile components used to form the stabilizer polymer and not including the weight of any components used to form optional acrylic component(s) (if present).

Examples of suitable polyols include aliphatic alcohols, cycloaliphatic alcohols, difunctional alcohols ("diols"), trifunctional alcohols ("triols"), tetrahydric or higher alcohols, and combinations thereof. Examples of some suitable polyols include ethylene glycol, propylene glycol, butylene glycol, neopentyl glycol, cyclohexane diol, cyclohexane dimethanol, hexane diol, glycerine, trimethylol propane ("TMP"), di trimethylolpropane, pentaerythritol, dipentaerythritol, trimethylol ethane, trimethylol butane substituted propane diols and triols (e.g., 2-methyl, 1,3-propane diol), substituted butane diols and triols, substituted pentane diols and triols, substituted hexane diols and triols, diethylene glycol and triols, and mixtures thereof. In preferred embodiments, the stabilizer polymer includes one or more polyols that are trifunctional or higher (e.g., TMP) to achieve branching and, in some embodiments, provide hydroxyl groups for attaching fatty acid pendant groups. Diols, when used, are preferably used in combination with trifunctional or higher alcohols.

Polyols can be included at any suitable level to achieve the desired result. In preferred embodiments, the stabilizer polymer includes at least about 20, more preferably at least about 22, and even more preferably at least about 25 wt-% of one or more polyols, based on the total weight of non-volatile components used to form the stabilizer polymer and not including the weight of any components used to form optional acrylic component(s) (if present). Preferably, the stabilizer polymer includes less than 60, preferably less than about 55, and even more preferably less than about 50 wt-% of one or more polyols, based on the total weight of non-volatile components used to form the stabilizer polymer and not including the weight of any components used to form optional acrylic component(s) (if present).

In preferred embodiments, one or more pendant groups that preferably contain a substituted or unsubstituted alkyl or alkenyl group are attached to the backbone of the stabilizer polymer. The number and type of such pendant groups can vary depending upon the properties desired for the stabilizer polymer. In some embodiments, the selection of pendant groups may contribute to enhanced compatibility between the stabilizer polymer and a thermoplastic material. For example, increasing the number of certain alkyl- or alkenyl-containing pendant groups may increase the compatibility of the stabilizer polymer with thermoplastic materials such as PVC.

In presently preferred embodiments, the one or more pendant groups that preferably contain a substituted or unsubstituted alkyl or alkenyl group are provided through incorporation of one or more saturated or unsaturated fatty acids. However, any suitable component(s) may be used to form the pendant groups.

In preferred embodiments, the one or more pendant groups have the structure represented by the following formula:

$$—X—R_1, \qquad (I)$$

where $R_1$ denotes a terminal organic group and X denotes an organic linking group for linking $R_1$ to another portion of the stabilizer polymer (preferably a backbone portion).

In preferred embodiments, $R_1$ is a substituted or unsubstituted alkyl, alkenyl, cycloalkyl, or cycloalkenyl group. $R_1$ preferably includes at least about 5, more preferably at least about 8, and even more preferably at least about 12 carbon atoms. Preferably, $R_1$ includes less than about 30, more preferably less than about 26 and even more preferably less than about 24 carbon atoms.

In some embodiments, $R_1$ preferably includes at least about one and more preferably at least about two carbon-carbon double bonds. In a presently preferred embodiment, $R_1$ contains two or more conjugated carbon-carbon double bonds. While not wishing to be bound by theory, the inclusion of conjugated carbon-carbon double bonds in $R_1$ is thought to increase the reactivity of the double bonds and thereby enhance one or more stabilizing characteristics of the stabilizer polymer, which may be desirable in certain embodiments.

In certain preferred embodiments (especially oxirane-free embodiments), $R_1$ is preferably an unsaturated fatty acid and even more preferably a conjugated unsaturated fatty acid. Examples of preferred unsaturated fatty acids include arichidonic, eleostearic, linoleic, linolenic, oleic, palmitoleic, licanic acid and mixtures thereof. Since commercially available sources of unsaturated fatty acids typically include both saturated and unsaturated fatty acids, the resin system of the present invention may include some $R_1$ groups formed from unsaturated fatty acids and other $R_1$ groups formed from saturated fatty acids. For example, in one embodiment, the stabilizer polymer is formed using a fatty acid mixture that contains about 61 wt-% of saturated fatty acids and about 39 wt-% of unsaturated fatty acids.

The stabilizer polymer preferably includes at least about 0.025, more preferably at least about 0.030, and even more preferably about 0.035 moles of pendant groups having the structure of formula (I) per 100 grams (g) of the stabilizer polymer, based on the total weight of non-volatile components used to form the stabilizer polymer and not including the weight of any components used to form optional acrylic component(s) (if present). Preferably, the stabilizer polymer includes less than about about 0.5, more preferably less than about 0.45, and even more preferably less than about 0.4 moles of pendant groups having the structure of formula (I) per 100 grams (g) of the stabilizer polymer, based on the total weight of non-volatile components used to form the stabilizer polymer and not including the weight of any components used to form optional acrylic component(s) (if present).

The stabilizer polymer of the present invention can include any suitable amount and combination of one or more fatty acids to produce the desired result. Preferably, at least a substantial portion, and in some embodiments substantially all, of the fatty acids incorporated into the stabilizer polymer are unsaturated. The amount of the one or more fatty acids may vary depending upon the molecular weight(s) of the incorporated fatty acid(s). For example, the amount of C12 fatty acids incorporated may differ from the amount of C18 fatty acids incorporated due to the difference in molecular weights. In certain embodiments formed using one or more C18 fatty acids, the stabilizer polymer preferably includes at least about 2.5, more preferably at least about 5.5, and even more preferably at least about 8.5 wt-% of one or more saturated or unsaturated C18 fatty acids, based upon the total weight of non-volatile components used to form the stabilizer polymer and not including the weight of any components used to form optional acrylic component(s) (if present). In the aforementioned C18 fatty acid embodiments, the stabilizer polymer preferably includes less than about 14, more preferably less than about 12.5, and even more preferably less than about 11.5 wt-% of one or more saturated or unsaturated C18 fatty acids, based upon the total weight of non-volatile components used to form the stabilizer polymer and not including the weight of any components used to form optional acrylic component(s) (if present).

X can be any suitable linking group. Examples of suitable linking groups include amide groups; carbonate groups; epoxide groups; ester groups; urea groups; urethane groups; $(CR_y)_z$ groups, where (i) y is 0, 1 or 2, (ii) z is 1 to 10, and (iii) R is independently selected from hydrogen, a halogen, oxygen, or an organic group; and combinations thereof. Ester linking groups are presently preferred. In one such preferred embodiment, X is formed by reacting a hydroxyl group belonging to a structural unit of the stabilizer polymer backbone with a carboxylic group of a fatty acid which contains $R_1$.

As discussed above, the resin system of the present invention can include one or more acrylic components of any suitable form. The acrylic component can be grafted or partly grafted to the stabilizer polymer or can be present in a separate acylic polymer. In some embodiments, the resin system includes a blend of any combination of the following: a stabilizer polymer (preferably a polyester), the stabilizer polymer with one or more acrylic components grafted thereto, and an acrylic polymer.

The acrylic component is preferably prepared through chain-growth polymerization using one or more ethylenically unsaturated monomers as reactants. Suitable monomers include (meth)acrylate compounds, vinyl monomers and the like, and combinations thereof. While not intending to be bound by theory, in preferred embodiments, the inclusion of one or more acrylic components is thought to enhance one or more of (a) compatibilization of the stabilizer polymer with thermoplastic materials such as, for example, PVC; (b) crosslinking of coating compositions (for example, crosslinking of the stabilizer polymer with a crosslinker such as a phenolic crosslinker); and (c) the hardness of cured coatings.

Examples of suitable (meth)acrylate compounds for forming the acrylic component include those having the structure: $CH_2=C(R_2)—CO—OR_3$, wherein $R_2$ is a hydrogen or a methyl group and $R_3$ is a hydrogen or a substituted or unsubstituted alkyl group preferably containing one to sixteen carbon atoms. The $R_3$ group can be substituted with one or more, and typically one to three, moieties such as hydroxy, halo, amino, phenyl, and alkoxy, for example. Suitable (meth)acrylate compounds for use in the acrylic groups therefore encompass hydroxy alkyl (meth)acrylates and aminoalkyl (meth) acrylates. The (meth)acrylate compound typically is an ester of acrylic or methacrylic acid wherein $R_3$ is a substituted or unsubstituted alkyl group containing one to sixteen carbon atoms. Examples of suitable (meth)acrylic acid esters are C1-C24 alkyl esters or cycloalkyl esters of acrylic or methacrylic acids, such as methyl acrylate, ethyl acrylate, propyl acrylate, isopropyl acrylate, n-butyl acrylate, isobutyl acrylate, t-butyl acrylate, hexyl acrylate, 2-ethylhexyl acrylate, n-octyl acrylate, decyl acrylate, stearyl acrylate, lauryl acrylate, cyclohexyl acrylate, methyl methacrylate, ethyl methacrylate, n-propyl methacrylate, isopropyl methacrylate, n-butyl methacrylate, isobutyl methacrylate, t-butyl methacrylate, hexyl methacrylate, 2-ethylhexyl methacrylate, octyl methacrylate, decyl methacrylate, lauryl methacrylate, stearyl methacrylate, cyclohexyl methacrylate, etc.; C2-C18 alkoxyalkyl esters of acrylic or methacrylic acids, such as methoxybutyl acrylate, methoxybutyl methacrylate, methoxyethyl acrylate, methoxyethyl methacrylate, ethoxybutyl acrylate, ethoxybutyl methacrylate, etc.; and mixtures thereof.

Preferred (meth)acrylate compounds include 2-hydroxyethyl acrylate, ethyl methacrylate, methacrylic acid, and mixtures thereof. In a presently preferred embodiment, at least some of the acrylic groups are formed using all three of these compounds.

Examples of suitable vinyl monomers for use in forming the acrylic component include styrene, halostyrene, isoprene, diallylphthalate, divinylbenzene, conjugated butadiene, alpha-methylstyrene, vinyl toluene, vinyl naphthalene and the like, and mixtures thereof. Other suitable polymerizable vinyl monomers can include, acrylamide, methacrylamide (or their methylol or etherified methylol derivatives), acrylonitrile, methacrylonitrile, vinyl acetate, vinyl propionate, vinyl butyrate, vinyl stearate, isobutoxymethyl acrylamide and the like, and mixtures thereof.

The acrylic component can be included at any suitable level to achieve the desired result. In preferred embodiments, the acrylic component is present in an amount of at least about 0, more preferably at least about 10, and even more preferably at least about 15 wt-%, based on the total weight of the stabilizer polymer and the acrylic component. Preferably, the acrylic component is present in the stabilizer polymer in an amount of less than about 80, more preferably less than about 50, and even more preferably less than about 40 wt-%, based on the total weight of the stabilizer polymer and the acrylic component. In a particularly preferred embodiment, the acrylic component constitutes about 30 wt-% of the stabilizer polymer.

The acrylic component can be incorporated into the stabilizer polymer using any suitable technique. Examples of some suitable techniques include (a) mixing and then reacting acrylic monomer components and monomer or oligomer precursors of the stabilizer polymer, (b) direct reaction of acrylic monomer components with a carbon-carbon double bond of the stabilizer polymer, or (c) grafting of acrylic monomer components onto the stabilizer polymer through hydrogen extraction.

Examples of suitable free-radical initiators for use in polymerizing the acrylic component include peroxides such as benzoyl peroxide, t-butyl peroxide, t-butyl hydroperoxide, t-amyl peroxide, t-amyl hydroperoxide, t-butyl peroxybenzoate, t-butyl peroxy-2 ethyl hexanoate, t-amyl peroxy-2 ethyl hexanoate and 1,1-di(tertioamylperoxy) cyclohexane; azoic-based initiators such as azobisisobutyronitrile and azobismethylbutyronitrile; UV or visible light initiators; and combinations thereof. Other free-radical initiators may additionally or alternatively be used. Benzoyl peroxide (BPO) is a preferred free-radical initiator. While not intending to be bound by theory, the inclusion of one or more free-radical initiators such as BPO is thought to contribute to grafting of acrylic component onto the stabilizer polymer through a hydrogen extraction.

The molecular weight of the stabilizer polymers of the present invention can vary depending upon the desired end use. In preferred embodiments, the stabilizer polymer has a number average molecular weight ($M_n$) of at least about 1,000, more preferably at least about 1,200, and even more preferably at least about 1,500. Preferably, the $M_n$ of the stabilizer polymer is less than about 4,000, more preferably less than about 3,000, and even more preferably less than about 2,000.

Stabilizer polymers of the present invention may exhibit any suitable acid number. Acid numbers are typically expressed as milligrams of KOH required to titrate a 1 gram sample to a specified end point. Methods for determining acid numbers are well known in the art. See, for example, ASTM D 974-04 entitled "Standard Test Method for Acid and Base Number by Color-Indicator Titration" and available from the American Society for Testing and Materials International of West Conshohocken, Pa. In some embodiments, the stabilizer polymer has an acid number of at least about 5, more preferably at least about 10, and even more preferably at least about 15 mg KOH/gram solid. Preferably, the stabilizer polymers has an acid number of less than about 60, more preferably less than about 50, and even more preferably less than about 40.

Stabilizer polymers of the present invention may exhibit any suitable hydroxyl number. Hydroxyl numbers are typically expressed as milligrams of potassium hydroxide (KOH) equivalent to the hydroxyl content of 1 gram of the hydroxyl-containing substance. Methods for determining hydroxyl numbers are well known in the art. See, for example, ASTM D 1957-86 (Reapproved 2001) entitled "Standard Test Method for Hydroxyl Value of Fatty Oils and Acids" and available from the American Society for Testing and Materials International of West Conshohocken, Pa. In preferred embodiments, the stabilizer polymers have a hydroxyl number of at least about 20, more preferably at least about 25, and even more preferably at least about 35. Preferably, the stabilizer polymers have a hydroxyl number of less than about 70, more preferably less than about 60, and even more preferably less than about 45.

In some embodiments, the stabilizer polymer of the present invention is formed using oxirane-containing components such as, for example, BADGE. Other suitable oxirane-containing components may contain, for example, aliphatic diglycidyl ethers such as cyclohexanedimethanol diglycydil ether ("CHDMDGE"), epoxidized oil, and mixtures thereof. In some embodiments, a BPA-free, oxirane-containing component may be used such as the non-BPA containing dihydric phenols (e.g., bis-4-hydroxy benzoate of 1,4-cyclohexane dimethanol) described in U.S. application Ser. No. 60/727,734, which is incorporated herein by reference. In certain BADGE-containing embodiments of the present invention, the coating composition includes at least about 20, more preferably at least about 25, and even more preferably at least about 30 wt-% of BADGE, based on the total weight of the stabilizer polymer. In certain BADGE-containing embodiments, the coating composition includes less than about 50, more preferably less than about 45, and even more preferably less than about 40 wt-% of BADGE, based on the total weight of the stabilizer polymer.

In some embodiments, the stabilizer polymer of the present invention is a reaction product of a polyol (preferably a triol), an unsaturated fatty acid, a dicarboxylic acid, and BADGE. The reactants may be added to a reaction vessel at the same time or added sequentially in any suitable order or grouping(s). The resulting polyester polymer is preferably acrylated and preferably has at least one, and more preferably at least two, terminal oxirane groups. While not intending to be bound by theory, the terminal oxirane groups are thought to help stabilize thermoplastic materials such as PVC and scavenge degradation products (e.g., HCl) resulting from degradation of the thermoplastic materials.

In one such embodiment, a polyol and an unsaturated fatty acid are reacted to form a first reaction product, which is then reacted with a dicarboxylic acid to form a second reaction product. The second reaction product is reacted with BADGE in the presence of a catalyst and then acrylated to form an acrylated, fatty-acid-modified stabilizer polymer. Examples of suitable catalysts include amines, phosphonium salts, and combinations thereof. Tertiary amines such as, for example, dimethlaminoethanol ("DMEA") are preferred catalysts.

In other embodiments of the present invention, the stabilizer polymer is formed from components that are preferably free of (i.e., do not contain any detectable amount) BPA and oxirane-containing compounds (including BADGE). In one such embodiment, the stabilizer polymer is an acrylated, fatty-acid-modified polyester that is the reaction product of a polyol (preferably a triol), a polycarboxylic acid, a fatty acid (preferably an unsaturated fatty acid and more preferably a conjugated fatty acid), an optional diol, and a meth(acrylate) compound. The reactants may be reacted at the same time (e.g., by adding to a reactor at the same time) or may be reacted sequentially in any suitable order. If reacted sequentially, reactions may be ordered to modify properties or characteristics of the resulting copolymer (e.g., molecular weight, presence or absence of low molecular weight species, reactivity, etc.). In a preferred embodiment, a polyester intermediate free of fatty acids is formed and then reacted with an unsaturated fatty acid to form an unsaturated, fatty-acid-modified polyester polymer. This resulting polymer is then preferably reacted with one or more (meth)acrylate compounds. The resulting acrylated stabilizer polymer is thought to include at least one terminal hydroxyl groups. While not intending to be bound by theory, the terminal hydroxyl group(s) are thought to react with crosslinkers and thereby contribute to the crosslinking of coating compositions containing the stabilizer polymer.

The unsaturated fatty acid(s) used to form oxirane-free stabilizer polymers of the present invention are preferably highly unsaturated and preferably contains a plurality of conjugated carbon-carbon double bonds. While not wishing to be bound by theory, it is believed that oxirane-free embodiments require additional carbon-carbon double bonds to exhibit comparable stabilization properties relative to oxirane-containing embodiments. This is believed to be due to the absence of oxirane groups, which, as discussed above, are thought to contribute in some embodiments to the stabilization properties of the stabilizer polymer. Preferably, the unsaturated fatty acid used in such embodiments contains at least about 1 and more preferably at least about 2 carbon-carbon double bonds. Specific examples of suitable highly unsaturated fatty acids for forming oxirane-free stabilizer polymers of the present invention include linoleic, linolenic, elcostéaric, licanicacid, and mixtures thereof.

Coating compositions of the present invention preferably include the stabilizer polymer described herein, a thermoplastic material, and a carrier.

In preferred embodiments, coating compositions of the present invention are preferably substantially free, more preferably essentially free, even more preferably essentially completely free, and optimally completely free of one or more of the following compounds A-D:
  (A) mobile BPA, BPF and aromatic glycidyl ether compounds (e.g., BADGE, BFDGE and epoxy novalacs);
  (B) bound BPA, BPF and aromatic glycidyl ether compounds (e.g., BADGE, BFDGE and epoxy novalacs);
  (C) oxirane-containing compounds (e.g., BADGE, BFDGE, epoxy novalacs, and epoxidized oils); and
  (D) certain tin-containing compounds such as tin mercaptans and tin carboxylates.

In some embodiments, coating compositions of the present invention are preferably substantially free, more preferably essentially free, even more preferably essentially completely free, and optimally completely free of two or more, three or more, or all of the above compounds A-D.

Coating compositions of the present invention may include any suitable amount of stabilizer polymer to produce the desired result. In preferred embodiments, the coating compositions include at least about 15, more preferably at least about 20, and even more preferably at least about 25 wt-% of stabilizer polymer, based on the total nonvolatile weight of the coating composition. Preferably, coating compositions of the present invention include less than about 65, more preferably less than about 60, and even more preferably less than about 55 wt-% of stabilizer polymer, based on the total nonvolatile weight of the coating compositions.

As discussed above, coating compositions of the present invention preferably include a thermoplastic material in addition to the stabilizer polymer. Examples of suitable thermoplastic materials include halogenated polyolefins, which include, for example, copolymers and homopolymers of vinyl chloride, vinylidenefluoride, polychloroprene, polychloroisoprene, polychlorobutylene, and combinations thereof. PVC is a particularly preferred thermoplastic material.

In applications involving packaging coatings, dispersion grade thermoplastic particles are preferred, where the particles range from about 0 to about 5 microns. Other sizes, however, can be used such as, for example, non-dispersion grade thermoplastic particles that range from about 5 to about 100 microns.

Preferred coating compositions of the present invention include at least about 10, more preferably at last about 15, and even more preferably at least about 20 wt-% of thermoplastic material, based on the total nonvolatile weight of the coating composition. Preferred coating compositions of the present invention include less than about 80, more preferably less than about 70, and even more preferably less than about 65 wt-% of thermoplastic material, based on the total nonvolatile weight of the coating composition.

The thermoplastic material is preferably dispersed in a liquid carrier to form a thermoplastic dispersion. Examples of suitable liquid carriers include an organic solvent, a plasticizer, or mixtures thereof Suitable organic solvents include, for example, polar solvents such as ketones (e.g., MIBK and DIBK), glycol ethers, alcohols, aliphatic hydrocarbons, aromatic hydrocarbons, or mixtures thereof. In some embodiments, it is advantageous to choose a solvent that has an affinity to the thermoplastic material and/or one that can swell the thermoplastic particles to help increase viscosity. Preferred carriers have sufficient volatility to evaporate substantially from the coating composition during the curing process.

Preferred coating compositions of the present invention include at least about 35, more preferably at least about 40, and even more preferably at least about 45 wt-% of solids, based on the total weight of the coating composition. Preferably, coating compositions of the present invention include less than about 80, more preferably less than about 70, and even more preferably less than about 65 wt-% of solids, based on the total weight of the coating composition.

Preferred coating compositions of the present invention include at least about 20, more preferably at least about 30, and even more preferably at least about 35 wt-% of liquid carrier, based on the total nonvolatile weight of the coating composition. Preferred coating compositions of the present invention include less than about 65, more preferably less than about 60, and even more preferably less than about 55 wt-% of liquid carrier, based on the total weight of the coating composition.

In some embodiments, coating compositions of the present invention are organosols or plastisols. Organosols useful in the compositions of the present invention, include, for example, vinyl organosols. A "vinyl organosol," as used herein, is a dispersion of vinyl chloride polymers (preferably high-molecular-weight vinyl chloride polymers) in a liquid carrier. Suitable vinyl chloride polymers preferably have a number average molecular weight ($M_n$) of about 50,000 to about 300,000; more preferably between about 75,000 to about 200,000; and even more preferably between about 100,000 to about 150,000. Examples of suitable plasticizers include phosphates, adipates, sebacates, epoxidized oils (not preferred, but may be used in certain embodiments if desired) and polyesters.

In some embodiments, coating compositions of the present invention may be formulated using one or more curing agents, including, for example, one or more crosslinkers. The choice of a particular crosslinker typically depends on the particular product being formulated. For example, some coating compositions are highly colored (e.g., gold-colored coatings). These coatings may typically be formulated using crosslinkers that tend to have a yellowish color. In contrast, white coatings are generally formulated using non-yellowing crosslinkers, or only a small amount of a yellowing crosslinker.

The concentration of crosslinker included in coating compositions of the present invention may vary depending upon the desired result. Preferred coating compositions contain at least about 0.01, more preferably at least about 0.5, and more preferably at least about 3 wt-% of crosslinker, by weight of nonvolatile material in the coating composition. Preferred coating compositions contain less than about 30, more preferably less than about 25, and even more preferably less than about 20 wt-% of crosslinker, by weight of nonvolatile material in the coating composition.

Any suitable crosslinker can be used. For example, phenolic crosslinkers (e.g., phenoplasts), amino crosslinkers (e.g., aminoplasts), and combinations thereof, may be used.

Examples of suitable phenolic crosslinkers (e.g., phenoplasts) include the reaction products of aldehydes with phenols. Formaldehyde and acetaldehyde are preferred aldehydes. Examples of suitable phenols that can be employed include phenol, cresol, p-phenylphenol, p-tert-butylphenol, p-tert-amylphenol, cyclopentylphenol, cresylic acid, BPA, and combinations thereof. Examples of suitable commercially-available phenolic compounds include the BAKELITE 6535LB, 6581 LB, and 6812LB (each available from Hexion Specialty Chemicals GmbH), DUREZ 33162 (Durez Corporation, Addison, Tex.), PHENODUR PR 285 55/IB/B and PR 897 (each available from CYTEC Surface Specialties, Smyrna, Ga.), and SANTOLINK EP 560 products.

Amino crosslinker resins (e.g., aminoplasts) are typically the condensation products of aldehydes (e.g., such as formaldehyde, acetaldehyde, crotonaldehyde, and benzaldehyde) with amino- or amido-group-containing substances (e.g., urea, melamine and benzoguanamine). Suitable amino crosslinking resins include, for example, benzoguanamine-formaldehyde-based resins, melamine-formaldehyde-based resins (e.g., hexamethonymethyl melamine), etherified melamine-formaldehyde, and urea-formadehyde-based resins. In a preferred embodiment, the amino crosslinker is a benzoguanamine-based resin.

Condensation products of other amines and amides can also be employed such as, for example, aldehyde condensates of triazines, diazines, triazoles, guanadines, guanamines and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is typically formaldehyde, other similar condensation products can be made from other aldehydes, such as acetaldehyde, crotonaldehyde, acrolein, benzaldehyde, furfural, glyoxal and the like, and mixtures thereof.

Suitable commercially available amino crosslinking resins include, for example, CYMEL 301, CYMEL 303, CYMEL 370, CYMEL 373, CYMEL 1131, CYMEL 1125, and CYMEL 5010 Maprenal MF 980 (all available from Cytec Industries Inc., West Patterson, N.J.) and Uramex BF 892 (available from DSM, Netherlands).

In some embodiments, the coating composition includes a catalyst to increase the rate of cure. If used, a catalyst is preferably present in an amount of at least about 0.05, and more preferably at least about 0.1 wt-% of nonvolatile material. If used, a catalyst is preferably present in an amount of less than about 1, and more preferably less than about 0.5 wt-% of nonvolatile material. Examples of suitable catalysts include acid catalysts such as phosphoric acid, citric acid, dinonylnaphthalene disulfonic acid (DNNSA), dodecylbenzene disulfonic acid (DDBSA), p-toluene sulfonic acid (p-TSA), dinonylnaphthalene disulfonic acid (DNNDSA), phenyl acid phosphate (PAP), alkyl acid phosphate (AAP), and the like, and mixtures thereof.

The coating compositions of the invention may optionally include other additives that do not adversely affect the coating composition or a cured coating composition resulting therefrom. The optional additives are preferably at least substantially free of mobile BPA, BPF, and aromatic glycidyl ether compounds (e.g., BADGE, BFDGE and epoxy novalac compounds). Suitable additives include, for example, those that improve the processability or manufacturability of the composition, enhance composition aesthetics, or improve a particular functional property or characteristic of the coating composition or the cured composition resulting therefrom, such as adhesion to a substrate. Additives that may be included are carriers, emulsifiers, pigments, metal powders or paste, fillers, anti-migration aids, anti-microbials, extenders, curing agents, lubricants, coalescents, wetting agents, biocides, plasticizers, crosslinking agents, antifoaming agents, colorants, waxes, anti-oxidants, anticorrosion agents, flow control agents, thixotropic agents, dispersants, adhesion promoters, UV stabilizers, scavenger agents, or combinations thereof. Each optional ingredient can be included in a sufficient amount to serve its intended purpose, but preferably not in such an amount to adversely affect a coating composition or a cured coating composition resulting therefrom.

In addition, the coating composition may also include one or more secondary film forming compounds that are integrally associated with the thermoplastic material particles. Suitable secondary film forming compounds include, for example, acrylic resins and benzo guanamine-formaldehyde, phenolics, melamine formaldehyde, and other urea formaldehyde resins. The coating composition may also include one or more acid catalysts for curing the secondary film forming compounds. Examples of suitable acid catalysts include phosphoric acid, citric acid, dinonylnaphthalene disulfonic acid (DNNSA), dodecylbenzene disulfonic acid (DDBSA), p-toluene sulfonic acid (p-TSA), dinonylnaphthalene disulfonic acid (DNNDSA), phenyl acid phosphate (PAP), alkyl acid phosphate (AAP), and the like, and mixtures thereof.

Plasticizers can also be incorporated in the dispersion. Additional organic solvents can be added as diluents (e.g., aromatic solvents) to alter the application characteristics and adjust viscosity and fluidity for ease of processing and application.

Thermoplastic dispersions can be prepared using any suitable method to preferably provide sufficient suspension and dispersion of the particles included therein. Examples of suitable process methods include solution blending, high-speed dispersion, high-speed milling, and the like. A substantially homogeneous dispersion of the particles throughout the liquid carrier typically indicates an adequate mixture or blend. The thermoplastic particles preferably remain substantially undissolved in the liquid carrier.

To prepare the coating compositions of the present invention, a thermoplastic dispersion is generally made in a first step (a dispersion phase) where the composition is thickened and has somewhat higher solids than the subsequent phase, often referred to as the "let down," where the components (e.g., addition of the stabilizer polymer) are stirred at a slower rate. Examples of suitable process methods to make the coating compositions of the present invention include admixture, blending, paddle stirring, etc.

Cured coatings of the present invention preferably adhere well to metal (e.g., steel, tin-free steel (TFS), tin plate, electrolytic tin plate (ETP) aluminum, etc.) and provide high levels of resistance to corrosion or degradation that may be caused by prolonged exposure to, for example, food or beverage products. The coatings may be applied to any suitable surface, including inside surfaces of containers, outside surfaces of containers, container ends, and combinations thereof.

Cured coatings of the present invention are particularly well suited as adherent coatings for metal cans or containers, although many other types of articles can be coated. Examples of such articles include closures (including, e.g., internal surfaces of twist off caps for food and beverage containers); internal crowns; two and three-piece cans (including, e.g., food and beverage containers); shallow drawn cans; deep drawn cans (including, e.g., multi-stage draw and redraw food cans); can ends (including, easy open can ends); monobloc aerosol containers; and general industrial containers, cans, and can ends.

Preferred coating compositions of the present invention are particularly suited for use on food-contact surfaces of food or beverage containers. Preferably, the cured coatings are retortable when employed in food and beverage container applications. Preferred cured coatings of the present invention can withstand elevated temperature conditions frequently associated with retort processes or other food or beverage preservation or sterilization processes. Particularly preferred cured coatings exhibit enhanced resistance to such conditions while in contact with food or beverage products that exhibit one or more aggressive (or corrosive) chemical properties under such conditions. Examples of such aggressive food or beverage products may include meat-based products, milk-based products, fruit-based products, energy drinks, and acidic or acidified products.

Coating compositions of the present invention can be applied in a single coat (i.e., monocoat) system or can constitute one or more layers (e.g., a base layer, an intermediate layer, and/or a topcoat layer) of a multi-coat system. The coating compositions are typically applied either (a) directly to a surface of a substrate or (b) to one or more intermediate coats (e.g., size coats) applied to the substrate. Examples of suitable size coats include epoxy phenolic size coats, polyester size coats, and combinations thereof.

In some embodiments, the coating composition of the present invention is applied as a top coat over one or more size coats applied to, for example, an interior surface of a closure for use with food or beverage containers. In other embodiments, the coating composition of the present invention is applied as a monocoat directly to, for example, an interior surface of a three-piece or shallow drawn food can, a bottle crown, or a monobloc aerosol container.

The coating composition can be applied to a substrate using any suitable procedure such as, for example, spray coating, roll coating, coil coating, curtain coating, immersion coating, meniscus coating, kiss coating, blade coating, knife coating, dip coating, slot coating, slide coating, and the like, as well as other types of premetered coating. In one embodiment where the coating is used to coat metal sheets or coils, the coating can be applied by roll coating.

The coating composition can be applied to a substrate prior to, or after, forming the substrate into an article. In a preferred embodiment, at least a portion of the substrate is coated with a layer of the coating composition of the present invention, which is then cured before the substrate is formed into an article.

After applying the coating composition onto a substrate, the composition can be cured using a variety of processes, including, for example, oven baking by either conventional or convectional methods, or any other method that provides an elevated temperature that preferably allows the thermoplastic material particles to fuse together. The curing process may be performed in either discrete or combined steps. For example, substrates can be dried at ambient temperature to leave the coating compositions in a largely un-crosslinked state. The coated substrates can then be heated to fully cure the compositions. In certain instances, coating compositions of the present invention can be dried and heated in one step.

The curing process may be performed at temperatures in the range of about 177° C. to about 232° C., taking into account, however that the upper end of the temperature range can change depending on the decomposition temperature of the thermoplastic material. PVC, for example, begins to degrade at about 188° C., while other materials may degrade at higher or lower temperatures. In the situations where PVC is used and the substrate coated is in metal sheet form, curing can be performed at about 177° C. to about 205° C. for about 5 to about 15 minutes. Where the coating compositions are applied on metal coils, curing is typically conducted at temperatures of about 210° C. to about 232° C. for about 15-30 seconds.

Preferred coatings of the present invention exhibit excellent coating properties. When suitably cured and tested pursuant to the methods of the below Test Methods section, preferred coatings of the invention exhibit one or more (and in some embodiments all or substantially all) of the below described coating properties.

Preferred coatings of the present invention after retort pursuant to the Retort Method exhibit an adhesion rating of preferably at least 8, more preferably at least 9, and most preferably 10.

Preferred coatings of the present invention after retort pursuant to the Retort Method exhibit a blush rating of preferably at least 7, more preferably at least 8, even more preferably at least 9, and most preferably 10.

Preferred coatings of the present invention after retort pursuant to the Retort Method exhibit a stain resistance rating of preferably at least 6, more preferably at least 8, even more preferably at least 9, and most preferably 10.

Preferred coatings of the present invention before retort or pasteurization pass less than about 10 mA when tested pursuant to the Porosity Test, more preferably less than about 5, even more preferably less than about 2, and optimally less than about 1 mA. After pasteurization or retort, preferred coatings exhibit continuities of less than about 20, more preferably less than about 10, even more preferably less than about 5, and even more preferably less than about 2 mA.

Preferred coatings of the present invention exhibit a wedge bend percentage of greater than about 70, more preferably greater than about 80, even more preferably greater than about 85, and optimally greater than about 90%.

Test Methods

Unless indicated otherwise, the following test methods were utilized in the Examples that follow.

A. Adhesion Test

Adhesion testing was performed to assess whether the coating compositions adhere to the coated substrate. The Adhesion Test was performed according to ASTM D 3359—Test Method B, using SCOTCH 610 tape, available from 3M Company of Saint Paul, Minn. Adhesion is generally rated on a scale of 0-10 where a rating of "10" indicates no adhesion failure, a rating of "9" indicates 90% of the coating remains adhered, a rating of "8" indicates 80% of the coating remains adhered, and so on. A coating is considered herein to satisfy the Adhesion Test if it exhibits an adhesion rating of at least 8.

The results of this test for coatings prepared according to the present invention (after retort pursuant to the Retort Method) are presented in Table 4.

B. Blush Resistance Test

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush and a rating of "0" indicates complete whitening of the film. Samples of coated substrate were rated for blush as follows:

10: no observed blushing to the coating
8-9: a very slight haze observed on the surface of the coating
7: a slightly cloudy appearance to the coating observed
5-6: a moderate cloudy appearance to the coating observed
3-4: a cloudy appearance to the coating observed
1-2: near-complete whitening of the coating observed
0: complete whitening of the coating observed Blush ratings of at least 7 are typically desired for commercially viable coatings and optimally 9 or above. A coating is considered herein to satisfy the Blush Resistance Test if it exhibits a blush rating of at least 7 when tested as described above.

The results of this test for coatings prepared according to the present invention (after retort pursuant to the Retort Method) are presented in Table 4.

C. Stain Resistance Test

Stain resistance is generally measured visually using a scale of 0-10, where a rating of "10" indicates no staining and a rating of "0" indicates a complete change of the color of the film. Samples of coated substrate were rated for stain resistance as follows:

10: no discoloration of the coating observed
8-9: very slight discoloration of the coating observed
7: some discoloration of the coating observed
6: appreciable discoloration of the coating observed
2-5: strong discoloration of the coating observed
0-1: very strong discoloration of the coating observed Stain resistance ratings of at least 6 are typically desired for commercially viable coatings and optimally 8 or above. A coating is considered herein to satisfy the Stain Resistance Test if it exhibits a stain rating of at least 6 when tested as described above. The results of this test for coatings prepared according to the present invention (after retort pursuant to the Retort Method) are presented in Table 4.

D. Porosity Test

This test provides an indication of the level of flexibility of a coating. Moreover, this tests measures the ability of a coating to retain its integrity as it undergoes the formation process necessary to produce a food or beverage can end. In particular, it is a measure of the presence or absence of cracks or fractures in the formed end. To be suitable for food or beverage can end applications, a coating composition should preferably exhibit sufficient flexibility to accommodate the extreme contour of the rivet portion of the easy open food or beverage can end.

The end is typically placed on a cup filled with an electrolyte solution. The cup is inverted to expose the surface of the end to the electrolyte solution. The amount of electrical current that passes through the end is then measured. If the coating remains intact (no cracks or fractures) after fabrication, minimal current will pass through the end.

For the present evaluation, fully converted 206 standard opening can ends were exposed for a period of 4 seconds to an electrolyte solution comprised of 1% NaCl by weight in deionized water. Metal exposures were measured using a WACO Enamel Rater II, available from the Wilkens-Anderson Company, Chicago, Ill., with an output voltage of 6.3 volts. The measured electrical current, in milliamps, is reported. End continuities are typically tested initially and then after the ends are subjected to pasteurization or retort.

A coating is considered herein to satisfy the Porosity Test if it passes an electric current (after end formation) of less than about 10 milliamps (mA) when tested as described above. The results of this test for coatings prepared according to the present invention are presented in Table 3.

E. Retort Method

This test provides an indication of an ability of a coating to withstand conditions frequently associated with food or beverage preservation or sterilization. For the present evaluation, coated substrate samples (in the form of flat panels) were placed in a vessel and partially immersed in a test substance.

While partially immersed in the test substance, the coated substrate samples were placed in an autoclave and subjected to heat of 121° C. and pressure of 1 atm above atmospheric pressure for a time period of 90 minutes. After retort, the coated substrate samples were allowed to sit for at least 2 hours before being tested for adhesion, blush resistance, or stain resistance.

E. Wedge Bend Method

This test provides an indication of a level of flexibility of a coating and an extent of cure. For the present evaluation, test wedges were formed from coated rectangular metal test sheets (which measured 12 cm long by 10 cm wide). Test wedges were formed from the coated sheets by folding (i.e., bending) the sheets around a mandrel. To accomplish this, the mandrel was positioned on the coated sheets so that it was oriented parallel to, and equidistant from, the 12 cm edges of the sheets. The resulting test wedges had a 6 mm wedge diameter and a length of 12 cm. To assess the wedge bend properties of the coatings, the test wedges were positioned lengthwise in a metal block of a wedge bend tester and a 2.4 kg weight was dropped onto the test wedges from a height of 60 cm.

The deformed test wedges were then immersed in a copper sulphate test solution (prepared by combining 20 parts of $CuSO_4.5H_2O$, 70 parts of deionized water, and 10 parts of hydrochloric acid (36%)) for about 2 minutes. The exposed metal was examined under a microscope and the millimeters of coating failure along the deformation axis of the test wedges was measured.

The results of this test for coatings prepared according to the present invention are presented in Table 3, with the data expressed as a wedge bend percentage using the following calculation:

$$100\% \times [(120\ mm) - (mm\ of\ failure)]/(120\ mm).$$

A coating is considered herein to satisfy the Wedge Bend Test if it exhibits a wedge bend percentage of 70% or more.

EXAMPLES

The present invention is illustrated by the following examples. It is to be understood that the particular examples, materials, amounts, and procedures are to be interpreted broadly in accordance with the scope and spirit of the invention as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Abbreviations, Descriptions, and Sources of Materials

| | |
|---|---|
| BAKELITE 6470LB | Phenolic resin Hexion Specialty Chemicals GmbH |
| CYCAT 600 | Organic acid catalyst CYTEC Industries, Inc., West Paterson, NJ |
| DBTL | Dibutyltindilaurate |
| DER 331 | Liquid epoxy resin Dow |
| EDG | Diethylene glycol monoethyl ether |
| LUBAPRINT 436 ND | Lubricant Bader |
| NACUREN 5925 | Dodecyl benzene sulfonic acid King Industries |
| PAMOLYN 200 | Isomerised tall oil fatty acid with high linoleic acid content Eastman |
| PAMOLYN 380 | Isomerised tall oil fatty acid with high linoleic acid content Eastman |
| PR285 | PHENODUR PR285 phenolic resin CYTEC Surface Specialties, Smyrna, GA |
| SOLV 100 | SOLVESSO 100 aromatic solvent Exxon |
| VARCUM 2227 | Phenolic resin Sumimotomo Bakelite Co., Ltd. |
| VAZO 67 | 2-2'Azobis(2methyl butane nitrile) E.I. du Pont de Nemours and Company, Wilmington, DE |

Examples 1-3

Preparation of Polyester Acrylate Resin System

The compositional ingredients of the polyester resin compositions of each of respective Examples 1A-3A is provided in Table 1A. The compositional ingredients of each of the polyester acrylate resin compositions of Examples 1B-3B, which are formed from the polyester resin compositions of Examples 1A-3A, are provided in Table 1B.

TABLE 1A

| Component | Material | Example 1A grams (wt-%) | Example 2A grams (wt-%) | Example 3A grams (**wt-%) |
|---|---|---|---|---|
| 1 | TMP | 332.05 (7.160) | 5159 (6.682) | 14466.8 (20.69) |
| 2 | NPG | 1016.4 (21.917) | 15790 (20.453) | |
| 3 | adipic acid | 1609.08 (34.697) | 24999 (32.381) | 31320.9 (44.794) |
| 4 | DBTL | 3.96 (0.085) | 61.6 (0.080) | 82.3 (0.118) |
| 5 | xylene | 244.3 (5.268) | 4067.6 (5.268) | 7190.3 (10.284) |
| 6 | PAMOLYN 200 | | | 9520 (13.615) |
| 7 | PAMOLYN 380 | 726.66 (15.669) | 15052 (19.497) | |
| 8 | lauric acid | | | 15013.3 (21.471) |
| 9 | SOLV 100 | 1147 (24.733) | 19093 (24.731) | |
| Total | | 4637.55 (100) | 77202.2 (100) | 69922.4 (100) |
| *NVM | | 70.0 | 70.0 | N/A |

*wt-% of non-volatile material (NVM)
**wt-% of NVM for each component after removal of water via reflux.

TABLE 1B

| Component | Material | Example 1B grams (wt-%) | Example 2B grams (wt-%) | Example 3B grams (**wt-%) |
|---|---|---|---|---|
| 11 | Example 1A | 3135 (58.830) | | |
| 12 | Example 2A | | 76870.4 (58.778) | |
| 13 | Example 3A | | | 16582.2 (17.446) |
| 14 | DER 331 | | | 17204.5 (18.101) |
| 15 | butanol | 655.9 (12.308) | 16188.3 (12.378) | 23743.9 (24.981) |
| 16 | SOLV 100 | 521.2 (9.781) | 12804.4 (9.791) | |
| 17 | xylene | | | 22085.7 (23.236) |
| 18 | DMEA | | | 17.2 (0.018) |
| 19 | ethyl methacrylate | 935.16 (17.549) | 19842.9 (15.173) | 13825.4 (14.546) |
| 20 | methacrylic acid | 60.6 (1.137) | 1284.9 (0.982) | 544.3 (0.573) |
| 21 | 2-hydroxyethyl acrylate | | 3305.2 (2.527) | |
| 22 | n-butoxy methacrylamide | | | 763.3 (0.803) |
| 23 | VAZO 67 | 8.26 (0.155) | 201.5 (0.154) | 113.2 (0.119) |
| 24 | t-butyl peroxybenzoate | 12.77 (0.24) | 284 (0.217) | 168.7 (0.176) |
| total | | 5328.89 (100) | 130781.6 (100) | 95048.4 (100) |
| *NVM | | 60.261 | 60.198 | 49.971 |

*wt-% of non-volatile material (NVM)
**wt-% of NVM for each component after removal of water via reflux.

Example 1A

The polyester resin composition of Example 1A was produced as described below. Components 1-3 were charged to a vessel equipped with a stirrer, reflux condenser, packed column, thermocouple, and a heating mantle. The mixture was heated to 100° C. After the mixture melted, component 4 was added and the resulting mixture was heated to 240° C. Water was removed from the mixture via reflux using the packed column (the head of the column did not exceed a temperature of about 105° C. during reflux). Once the water was substantially removed from the mixture (about 345 g of total water was extracted), the mixture was cooled to 200° C. and 135 g of component 5 were added. The mixture was then gently refluxed at a temperature of about 200° C. until it exhibited an acid value of less than 3. The resulting mixture having a temperature of about 215° C. was cooled to about 160° C.

At 160° C., components 5 and 7 and 109.3 g of component 5 were slowly added to the mixture. The resulting mixture was then refluxed to eliminate water until the mixture exhibited an acid value of less than 5, which resulted in the removal of an additional 51 g of water. The mixture was then cooled to 150° C. and diluted with component 9 to yield a composition a solids content of about 70 wt-% NVM.

Example 1B

The polyester acrylate resin composition of Example 1B was produced as described below. Component 11, 635.9 g of component 15, and component 16 were charged to a vessel equipped with a stirrer, reflux condenser, thermocouple, and heating mantle. The resulting mixture was heated to between about 115-120° C. at total reflux. While maintaining the temperature of the mixture between about 115-120° C., a pre-mix of 7.89 g of component 24 and components 19, 20, and 23 was added to the mixture over 90 minutes. After the addition of the pre-mix was complete, the mixture was immediately flushed with 20 g of component 15. The mixture was then held for 1 hour at about 115-120° C. A spike of 1.22 g of component 24 was added every hour while the temperature of the reaction mixture was held at about 115-120° C. Four total spikes were added. After addition of the last spike, the mixture was held at about 115-120° C. until the wt-% NVM was stable—at which point heating was stopped. The resulting composition exhibited a solid content of about 58-60 wt-% NVM (after heating a 1 g sample for 30 minutes at 150° C.), an acid value of about 10-15, and a viscosity of about 4-6 poises (using a Number 6 Ford Cup at about 25° C.).

Example 2A

The polyester resin composition of Example 2A was produced as described below. Components 1-3 were charged to a vessel equipped with a stirrer, reflux condenser, packed column, thermocouple, and a heating mantle. The mixture was heated to 100° C. After the mixture melted, component 4 was added and the resulting mixture was heated to 240° C. Water was removed from the mixture via reflux using the packed column (the head of the column did not exceed a temperature of about 105° C. during reflux). Once the water was substantially removed from the mixture (about 5,600 g of total water was extracted), the mixture was cooled to 200° C. and 2,099.5 g of component 5 was added. The mixture was then gently refluxed at a temperature of about 200° C. until it exhibited an acid value of less than 3. The resulting mixture having a temperature of about 215° C. was cooled to about 160° C.

At 160° C., components 7 and 1,968.1 g of component 5 were slowly added to the mixture. The resulting mixture was then refluxed to eliminate water until the mixture exhibited an acid value of less than 5, which resulted in the removal of an additional 520 g of water. The mixture was then cooled to 150° C. and diluted with component 9 to yield a composition (containing the polyester resin of Example 2A) having a solid content of about 70 wt-% NVM.

Example 2B

The polyester acrylate resin of Example 2B was produced as described below. Components 12 and 16 and 14,917 g of component 15 were charged to a vessel equipped with a stirrer, reflux condenser, thermocouple, and heating mantle. The resulting mixture was heated to between about 115-120° C. at total reflux. While maintaining the temperature of mixture between about 115-120° C., a pre-mix of 193.7 g of component 24 and components 19, 20, 21, 23 were added to the mixture over 90 minutes. After the addition of the pre-mix was complete, the resulting mixture was immediately flushed with 1,271.3 g of component 15. The mixture was then held for one hour at about 115-120° C. Then a spike of 30.1 g of component 24 was added every hour while the temperature of the reaction mixture was held at about 115-120° C. Three total spikes were added and, after addition of the last spike, the mixture was held at about 115-120° C. until the NVM was stable—at which point heating was stopped. The resulting composition exhibited a solid content of about 58-60 wt-% NVM (after heating a 1 g sample for 30 minutes at 150° C.), an acid value of about 10-15, and a viscosity of about 8-12 poises (using a Number 6 Ford Cup at about 25° C.).

Example 3A

The polyester resin composition of Example 3A was produced as described below. Component 6 was charged to a reactor equipped with a stirrer, reflux condenser, packed column, decanter, thermocouple, and a heating mantle. Then, under nitrogen at a temperature of 80° C., components 1 and 8 were slowly added to the reactor. After the mixture melted, component 4 and 805.3 g of component 5 were added. The mixture was refluxed to remove water (the head of the column did not exceed a temperature of about 105° C. during reflux), which resulted in the removal of about 1,900 g of water. Once the mixture exhibited an acid value of less than 3, the mixture was cooled from a temperature of about 225° C. to about 140° C. Component 2 and 6,385 g of component 5 were added to the mixture, which was again refluxed to eliminate water. Reflux was continued until the mixture exhibited an acid value of about 187, which resulted in the removal of about 5,740 g of water. The mixture was then cooled from about 215° C. to about 130-140° C.

Example 3B

The polyester acrylate resin composition of Example 3B was produced as described below. Components 13 and 14 and 7,766.6 g of component 17 were charged to a vessel equipped with a stirrer, reflux condenser, thermocouple, and heating mantle. The mixture was heated to about to 140-145° C. at total reflux. At 100° C., 154.8 g of component 17 and component 18 were added to the mixture. The resulting mixture was maintained at about 140-145° C., and acid value, viscosity (using the Noury method), and weight per equivalent epoxy ("WPE") were checked regularly. When an acid value of less than about 1 was achieved, the mixture had a viscosity of about 100 poises and a WPE of about 800-900 grams per mole. 14,164.3 g of component 17 were then added to the reactor and the mixture was cooled. When the mixture had cooled to about 120° C., 9,626.7 g of component 15 were added. While maintaining a temperature of between about 115-120° C., a pre-mix of components 19, 20, 22, 23, and 113.2 g of component 24 were added to the reactor over 90 minutes. After the addition of the pre-mix was complete, the resulting mixture was immediately flushed with 1,000 g of component 15.

The mixture was then held for 1 hour at about 115-120° C. Then a spike of 18.5 g of component 24 was added every hour while the temperature of the reaction mixture was held at about 115-120° C. Three total spikes were added and, after addition of the last spike, the mixture was held at about 115-120° C. until the NVM was stable. Once the NVM was stable, 13,117.2 g of component 15 were added and the heating was stopped. The resulting composition exhibited a solids content of about 58-60 wt-% NVM (after heating a 1 g sample for 30 minutes at 150° C.), an acid value of about 10-15, and a viscosity of about 40-45 poises (using a Number 4 Ford Cup at about 25° C.).

Examples 4-7

Preparation of Organosol Coating Compositions

The compositional ingredients for each of the coating compositions of Examples 4-7 are provided in Table 2. To prepare the coating compositions of Examples 4-6, the resin compositions of Examples 1B-3B were each charged to a vessel and the solvents were added under moderate agitation. Once the introduction of solvents was completed, sifted GEON 178 PVC powder (from Polyone) was added to the mixture under agitation. The resulting mixture was vortexed until a dispersion exhibiting a 7 on the Hegman gauge scale was achieved. The phenolic resins and lubricants were then sequentially added to the dispersions under moderate agitation to produce the organosol coating compositions of Examples 4-7.

TABLE 2

| Ingredient | *NVM (%) | Ex. 4 (parts by weight) | Ex. 5 (parts by weight) | Ex. 6 (parts by weight) | Ex. 7 (parts by weight) |
|---|---|---|---|---|---|
| Ex. 1B resin | 58.9 | 47.4 | | | 48.8 |
| Ex. 2B resin | 59.2 | | 48.8 | | |
| Ex. 3B resin | 49.8 | | | 24.77 | |
| SOLV 100 | | 7.7 | 9.2 | 11.4 | 8.4 |
| EDG | | 7.7 | 9.2 | 11.4 | 8.4 |
| GEON 178 | 100 | 21.3 | 20.6 | 45.2 | 20.6 |
| BAKELITE 6470LB | 73 | 3.3 | 8.9 | | 8.9 |
| PR 285 | 55 | 8.6 | | 3 | |
| VARCUM 2227 | 55 | | 1.7 | 2.1 | |
| Lanoline solution | 30 | 1 | 0.9 | 1 | 1 |
| LUBAPRINT 436 ND | | 1 | 0.9 | 1.1 | 1 |
| NACURE 5925 solution | 20 | 2 | | | |
| CYCAT 600 | | | | | 0.25 |
| Total | | 100 | 100 | 100 | 100 |
| *NVM | | 54.2 | 55.1 | 59.8 | 53.6 |
| **Viscosity | | 120 seconds | 122 seconds | 192 Seconds | — |

*wt-% of non-volatile material (NVM)
**Indicates the viscosity of each coating composition at 25° C. as determined by a No. 4 Ford Cup.

Examples 8-10

Coating of Substrate with a Two-Coat System Including the Organosol Coating Compositions of Examples 4-6 as Top Coats A phenolic size coat (containing about 80 wt-% epoxy resin and about 20 wt-% phenolic resol resin, based on total solids) was first applied to samples of 0.22 millimeter (mm) gauge electrolytic tin plate (ETP) using a bar coater. The coated substrate samples were then cured in an oven for 12 minutes at a total oven time ("TOT") of 200° C. The dry film weight of the cured size coating was about 7-8 g/m$^2$.

The coating compositions of Examples 4-6 were applied to the cured size coatings using a bar coater. The resulting coated substrate samples were then cured in an oven for 12 minutes at a TOT of 200°. The dry film weight of the cured top coatings formed by the compositions of Examples 4-6 was about 12 g/m².

Example 11

Coating of Substrate with a Monocoat System

The coating composition of Example 7 was applied to mm gauge ETP using a bar coater. The resulting coated substrate samples were then cured in an oven for 12 minutes at a TOT of 200°. The dry film weight of the cured top coatings formed by the compositions of Example 7 was about 12 g/m².

Physical Properties of Easy Open Ends Formed from the Coated Substrate Samples of Examples 8-10

206 standard can ends were formed from each of the coated substrate samples of Examples 8-10. The can ends were subjected to the Porosity and Wedge Bend Tests. The results of these tests are shown in Table 3.

TABLE 3

| Example | Top Coat Composition | Porosity (mA) | Wedge Bend (%) |
|---|---|---|---|
| 8 | Ex. 4 | 1.2 | 90 |
| 9 | Ex. 5 | 0.1 | 93 |
| 10 | Ex. 6 | 0.1 | 91 |

The results summarized in Table 3 indicate that the two-coat system of Examples 8-10 passed the Porosity and Wedge Bend Tests and exhibited levels of flexibility suitable for use in easy open end applications.

Effect of Retort on the Coated Substrate Samples of Examples 8-11

The coated substrate samples of Examples 8-11 were then retorted pursuant to the above Retort Method in the following test substances: tap water, test substance A, test substance B. Test substance A was prepared by mixing 20.0 g of NaCl and 40.0 g of acetic acid in a sufficient volume of water to produce 800 ml of solution. Test substance B was prepared by mixing 2.4 g of cysteine hydrochloride and 8.0 grams of sodium bicarbonate in a sufficient volume of water to produce 800 ml of solution.

After retort in one of the above test substances, the coated substrate samples of Examples 8-11 were subjected to the Adhesion Test, the Blush Resistance Test, and the Stain Resistance Test. A different coated substrate sample was used for each of these tests. The results of these tests are shown in Table 4. The Stain Resistance Test was only performed on coated substrate samples retorted in test substance B.

TABLE 4

| Example | Top Coat Composition | Test Substance | Adhesion | Blush Resistance | Stain Resistance |
|---|---|---|---|---|---|
| 8 | Ex. 4 | tap water | 10 | 8 | — |
|   |   | A | 8 | 9 | — |
|   |   | B | 10 | 6 | 8 |
| 9 | Ex. 5 | tap water | 10 | 10 | — |
|   |   | A | 9 | 10 | — |
|   |   | B | 9 | 9 | 9 |

TABLE 4-continued

| Example | Top Coat Composition | Test Substance | Adhesion | Blush Resistance | Stain Resistance |
|---|---|---|---|---|---|
| 10 | Ex. 6 | tap water | 9-10 | 10 | — |
|   |   | A | 9 | 9 | — |
|   |   | B | 9 | 5 | 9 |
| 11 | Ex. 7 | tap water | 10 | 10 | — |
|   |   | A | 10 | 9 | — |
|   |   | B | — | 7 | 8 |

The results of Table 4 indicate that the cured coating systems of Examples 8-11 each exhibited good adhesion and blush resistance when retorted in tap water or the acidified solution of test substance A. This data suggests that the cured coating systems of Examples 8-11 are capable of suitably withstanding sterilization or pasteurization procedures in the presence of water-based or acidic food or beverage products.

The cured two-coat system of Example 9 exhibited good adhesion, blush resistance, and stain resistance when retorted in test substance B. The data in table 4 suggests that the cured two-coat systems of Examples 8-11 (and particularly Example 9) are capable of exhibiting certain desirable coating characteristics when subjected to sterilization or pasteurization procedures in the presence of protein-based or meat-based food or beverage products.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A coating composition comprising:
  a resin system comprising:
    a stabilizer polymer having a polyester backbone and a plurality of pendant alkenyl groups each having carbon-carbon double bonds, and
    an acrylic component; and
  a thermoplastic dispersion comprising polyvinyl chloride particles and a carrier.

2. The composition of claim 1, further comprising a crosslinker.

3. The composition of claim 1, wherein the stabilizer polymer includes the acrylic component.

4. The composition of claim 1, wherein the coating composition is completely free of mobile BPA, BPF, and aromatic glycidyl ether compounds.

5. The composition of claim 1, wherein the coating composition is substantially free of BPA, BPF, and aromatic glycidyl ether compounds.

6. The composition of claim 1, wherein at least two of the carbon-carbon double bonds are conjugated double bonds.

7. The composition of claim 1, wherein at least one of the carbon-carbon double bonds is provided by an unsaturated fatty acid.

8. The composition of claim 1, wherein at least one of the pendant alkenyl groups comprises a structural unit represented by the formula (I):

$$-X-R_1,$$

wherein:

R₁ is a terminal organic group that comprises a substituted or unsubstituted alkyl, alkenyl, cycloalkyl, or cycloalkenyl groups; and X is a divalent linkage group that attaches R₁ to the polyester backbone, wherein X comprises an amide, carbonate, epoxide, ester, urea, urethane group, or $(CR_y)_z$ groups, where y is 0, 1 or 2, z is an integer from 1 to 10, and R is independently selected from hydrogen, a halogen, oxygen, nitrogen, or an organic group.

9. The composition of claim 8, wherein the structural unit of formula (I) includes at least about 5 carbon atoms.

10. The composition of claim 8, wherein R₁ includes at least one of the carbon-carbon double bonds.

11. The composition of claim 1, wherein the stabilizer polymer includes at least one terminal hydroxyl group.

12. The composition of claim 1, wherein the stabilizer polymer includes at least one terminal oxirane group.

13. A packaging article with the composition of claim 1 adhered to at least a portion of one surface thereof.

14. A method comprising:

applying the coating composition of claim 1 to a substrate; and curing the coating composition to form a cured coating on the substrate.

15. A method comprising:
providing a resin system comprising:
  a stabilizer polymer having:
    a polyester backbone, and
    a plurality of pendant alkenyl groups each having carbon-carbon double bonds; and
  an acrylic component;
providing a carrier;
providing polyvinyl chloride particles; and
preparing a coating composition that includes the resin system, the carrier, and the polyvinyl chloride particles.

16. The method of claim 15, further comprising:
forming the resin system by reacting:
  a polyol,
  a polycarboxylic acid,
  an unsaturated fatty acid, and
  a (meth)acrylate compound.

17. The method of claim 16, further comprising forming the stabilizer polymer by reacting the polyol, the polycarboxylic acid, the unsaturated fatty acid, and the (meth)acrylate compound with a diglycidyl ether compound.

18. The method of claim 16, wherein the polyol includes at least 3 hydroxyl groups.

19. The method of claim 16, wherein at least one of the carbon-carbon double bonds is provided by an unsaturated fatty acid.

20. The method of claim 16, wherein at least two of the carbon-carbon double bonds are conjugated double bond.

* * * * *